United States Patent
Eriksson

(10) Patent No.: US 11,882,812 B2
(45) Date of Patent: Jan. 30, 2024

(54) TOOL-POSITIONING SYSTEM AND METHOD, ROTARY MILKING PLATFORM, COMPUTER PROGRAM AND NON-VOLATILE DATA CARRIER

(71) Applicant: DELAVAL HOLDING AB, Tumba (SE)

(72) Inventor: Andreas Eriksson, Tumba (SE)

(73) Assignee: DeLaval Holding AB, Tumba (SE)

(*) Notice: Subject to any disclaimer, the term of this patent is extended or adjusted under 35 U.S.C. 154(b) by 501 days.

(21) Appl. No.: 17/290,712

(22) PCT Filed: Oct. 28, 2019

(86) PCT No.: PCT/SE2019/051070
§ 371 (c)(1),
(2) Date: Apr. 30, 2021

(87) PCT Pub. No.: WO2020/091668
PCT Pub. Date: May 7, 2020

(65) Prior Publication Data
US 2021/0392841 A1      Dec. 23, 2021

(30) Foreign Application Priority Data

Nov. 1, 2018   (SE) .................................. 1800212-1

(51) Int. Cl.
*G06T 7/70*         (2017.01)
*A01K 1/12*         (2006.01)
(Continued)

(52) U.S. Cl.
CPC .............. *A01K 1/126* (2013.01); *A01J 5/017* (2013.01); *B25J 9/1697* (2013.01);
(Continued)

(58) Field of Classification Search
CPC . A01K 1/126; A01K 1/00; A01K 1/12; A01K 1/123; A01J 5/017; A01J 5/0175;
(Continued)

(56) References Cited

U.S. PATENT DOCUMENTS 6,427,625 B1    8/2002  Schuster
2010/0278374 A1 11/2010 Hallstrom et al.
(Continued)

FOREIGN PATENT DOCUMENTS

DE   37 42 867      7/1989
EP   3 241 431     11/2017
(Continued)

OTHER PUBLICATIONS

International Search Report for PCT/SE2019/051070 dated Feb. 3, 2020, 3 pages.
(Continued)

*Primary Examiner* — Jose L Couso
(74) *Attorney, Agent, or Firm* — NIXON & VANDERHYE

(57) ABSTRACT

The positions of the tools in an automatic milking arrangement are determined by registering, via a camera at an origin location, three-dimensional image data representing the tools whose positions are to be determined. Using an algorithm involving matching the image data against reference data, tool candidates are identified in the three-dimensional image data. A respective position is calculated for the tools based on the origin location and data expressing respective distances from the origin location to each of the identified tool candidates. It is presumed that the tools are arranged according to a spatially even distribution relative to one another. Therefore, any tool candidate is disregarded, which is detected at such a position that the position for the candidate deviates from the spatially even distribution.

21 Claims, 2 Drawing Sheets

(51) Int. Cl.
    *G06T 7/73*    (2017.01)
    *A01J 5/017*   (2006.01)
    *B25J 9/16*    (2006.01)
    *B25J 15/00*   (2006.01)
    *B25J 15/04*   (2006.01)

(52) U.S. Cl.
    CPC ....... *B25J 15/0052* (2013.01); *B25J 15/0491* (2013.01); *G06T 7/74* (2017.01); *G05B 2219/45113* (2013.01); *G06T 2207/10028* (2013.01); *G06T 2207/30164* (2013.01)

(58) Field of Classification Search
    CPC .... A01J 5/003; A01J 5/025; A01J 5/04; A01J 5/007; A01J 5/02; B25J 9/1697; B25J 15/0052; B25J 15/0491; B25J 19/023; G06T 7/74; G06T 2207/10028; G06T 2207/30164; G06T 2207/30242; G06T 2207/10012; G06T 7/593; G06T 7/70; G06T 1/0014; G06T 7/0008; G05B 2219/45113; G05B 2219/2661; H04N 13/0081; H04N 13/0092; H04N 13/239; H04N 13/207; H04N 23/695; G06V 20/10; G06V 20/64; Y02P 90/02
    See application file for complete search history.

(56) References Cited

U.S. PATENT DOCUMENTS

| | | | |
|---|---|---|---|
| 2011/0061596 A1 | 3/2011 | Nilsson et al. | |
| 2019/0180092 A1* | 6/2019 | Foresman | ........... G06F 18/2113 |
| 2019/0188820 A1* | 6/2019 | Foresman | ............. A01J 5/0175 |
| 2020/0344972 A1* | 11/2020 | Foresman | .............. G06V 10/44 |

FOREIGN PATENT DOCUMENTS

| | | |
|---|---|---|
| WO | 98/45808 | 10/1998 |
| WO | 02/00011 | 1/2002 |
| WO | 2008/030086 | 3/2008 |
| WO | 2009/120129 | 10/2009 |
| WO | 2014/137214 | 9/2014 |
| WO | 2014/148972 | 9/2014 |
| WO | 2018/007242 | 1/2018 |
| WO | 2018/008026 | 1/2018 |

OTHER PUBLICATIONS

Written Opinion of the ISA for PCT/SE2019/051070 dated Feb. 3, 2020, 7 pages.
Swedish Search Report for SE 1800212-1 dated May 14, 2019, 3 pages.

* cited by examiner

TOOL-POSITIONING SYSTEM AND METHOD, ROTARY MILKING PLATFORM, COMPUTER PROGRAM AND NON-VOLATILE DATA CARRIER

CROSS-REFERENCE TO RELATED APPLICATIONS

This application is the U.S. national phase of International Application No. PCT/SE2019/051070 filed Oct. 28, 2019 which designated the U.S. and claims priority to SE 1800212-1 filed Nov. 1, 2018, the entire contents of each of which are hereby incorporated by reference.

TECHNICAL FIELD

The present invention relates generally to the initializing of an automatic milking equipment before operation. Especially, the invention relates to a system for determining the tool positions in an automatic milking arrangement and a method implemented in such a system. The invention also relates to rotary milking platform, a computer program and a non-volatile data carrier.

BACKGROUND

Today's automatic milking arrangements are highly complex installations. This is particularly true for rotary milking platforms, where a relatively large number of milking stations are served by a milking robot, or similar automatic equipment. Inter alia, this means that the milking robot attaches teatcups and other tools, e.g. cleaning cups, to the animals in a fully automatic manner. Therefore, the milking robot must be capable of automatically retrieving relevant tools from a storage place and possibly returning them thereto after completing each stage of the milking procedure. This, in turn, requires that the milking robot has very accurate knowledge about the respective position for each tool.

In the prior-art solutions, an operator teaches the milking robot relevant tool pick-up positions by controlling, for example via a joystick, a grip device of the milking robot to the space coordinate where the grip device shall be positioned when picking up a particular tool. When the grip device has a desired pick-up position relative to the tool, the operator programs this position into the control unit for the milking robot by entering a confirming command. Such semi manual programming of the tool positions is not ideal, for instance due to various accuracies in the user operated control link for the milking robot, and because—for safety reasons—the operator may need to be located at a place from which it is difficult, or even impossible, to see if the grip device is actually located at the desired pick-up position.

A rotary milking platform typically has a rather large number of milking stalls, say up to 80, and sometimes even more. Here, each milking stall has its own set of tools in the form of teatcups, and perhaps one or more cleaning cups.

Of course, programming the individual positions for all these tools into the milking robot by said semi manual manner is a very tedious as well as error-prone task. Therefore, in practice, the operator normally teaches the milking robot the respective tool positions for one stall as a reference. Then, the space coordinates for these reference positions are translated into corresponding space coordinates representing the positions for the tools in all the remaining stalls. In the light of the error sources mentioned, it is obvious that this strategy may result in considerable errors in the individual tool positions, especially for the larger types of rotary milking platforms.

SUMMARY

The object of the present invention is therefore to offer a convenient solution for determining the respective positions of the tools in an automatic milking arrangement in an efficient and accurate manner.

According to one aspect of the invention, the object is achieved by a system for determining the tools positions in an automatic milking arrangement. The system contains a camera and a control unit. The camera is configured to, from an origin location, register three-dimensional image data of at least four tools whose respective positions are to be determined. The control unit is configured to cause the camera to obtain three-dimensional image data representing the at least four tools. The control unit is configured to identify tool candidates in the three-dimensional image data using an algorithm involving matching the image data against reference data. The control unit is configured to calculate a respective position for the at least four tools based on the origin location and data expressing respective distances from the origin location to each of the identified tool candidates. The at least four tools are presumed to be stored in a dedicated space and be arranged according to a spatially even distribution relative to one another. Therefore, the control unit is further configured to disregard any tool candidate, which is detected at such a position that the position for the candidate deviates from the spatially even distribution.

This system is advantageous because it avoids a semi manual involvement of a human operator. Furthermore, each respective position of all the tools in all milking stations of an automatic milking arrangement can be specifically registered with high accuracy and stored for later use in a fully automatic manner, irrespective of whether the tools are organized along a line, along an arc or in a square.

Preferably, the control unit is configured to apply a linear regression classification algorithm on the three-dimensional image data to determine the spatially even distribution of the at least four tools.

Although, of course, each tool occupies a volume extending in all three space dimensions, it is advantageous to define the position for a particular tool to be a particular point on a depicted object in the three-dimensional image data. For example, the particular point may be a well-defined point on an identified tool candidate.

According to one embodiment of this aspect of the invention, the control unit is configured to store the respective positions for the at least four tools in a memory unit. The stored respective positions are retrievable from memory unit by a tool-pickup system in connection with picking up at least one of the at least four tools for attachment to an animal. Hence, the automatic milking arrangement can be put into operation directly.

Preferably, the at least four tools are placed in a tool rack and the system includes a grip device which is arranged on a robotic arm. After that the respective positions have been stored in the memory unit, the control unit is further configured to retrieve the stored respective positions from the memory unit, and control the robotic arm and the grip device to pick up at least one of the at least four tools from the tool rack. Further preferably, the respective position for each tool is expressed in terms of space coordinates for a particular point on an object depicted in the three-dimensional image data.

According to another embodiment of this aspect of the invention, the at least four tools are arranged relative to one another in a predefined pattern. Here, the control unit is configured to use information about the predefined pattern to confirm and/or disregard at least one of the tool candidates.

For example, the at least four tools may be arranged along a line. In such a case, the control unit is configured to disregard any tool candidate that is detected at an outlier distance exceeding a second threshold distance from an estimated line interconnecting at least two other tool candidates in a set of tool candidates for said tools.

If the at least four tools are arranged with an equal distance between each neighboring tool of the tools in the line, the control unit is configured to disregard a tool candidate that is detected at such a position that the tool candidate results in that a difference between first and second inter-distances exceeds a third threshold distance; where the first inter-distance is an interspace between a primary pair of neighboring tool candidates including the tool candidate and a first tool candidate and the second inter-distance is an interspace between a secondary pair of neighboring tool candidates including the tool candidate and a second tool candidate. Hence, so-called false positive tool candidates can be excluded from the process.

According to yet another embodiment of this aspect of the invention, if a processing time after having obtained the three-dimensional image data in the control unit, less than a predefined number of tool candidates have been identified, say four, the control unit is configured to reposition the camera to a new origin location. The control unit is configured to, from the new origin location, cause the camera to obtain updated three-dimensional image data representing the at least four tools. The three-dimensional image data may be dynamic. This means that the data may be represented by a video sequence and/or be built up from multiple still images registered from one or more origin locations in one or more angles. Further, the control unit is configured to calculate a respective position for the at least four tools based on the new origin location, and data expressing respective distances from the new origin location to each of the identified tool candidates. As a result, high data quality can be obtained also if, for some reason, there is a temporary interference obstructing the camera's view of the tools.

According to another embodiment of this aspect of the invention, the camera is arranged on the robotic arm. Naturally, this is advantageous because it allows convenient movement and repositioning of the camera. Moreover, the camera that is used during normal operation of the milking arrangement can also be used for programming the tool positions into the system.

According to another aspect of the invention, the object is achieved by a rotary milking platform having a plurality of milking stalls. Each milking stall, in turn, includes at least four tools, and the rotary milking platform contains the above-described system for determining the positions of tools. In addition to the above advantages, this rotary milking platform is advantageous because regardless of the platform size, no coordinate translations are required to register the tool positions.

According to another aspect of the invention, the object is achieved by a method for determining the positions of tools in an automatic milking arrangement. The method involves registering, via a camera at an origin location, three-dimensional image data representing at least four tools whose positions are to be determined. The method further involves identifying tool candidates in the three-dimensional image data using an algorithm involving matching the image data against reference data. A respective position for the at least four tools is then calculated based on the origin location and data expressing respective distances from the origin location to each of the identified tool candidates The at least four tools are arranged according to a spatially even distribution relative to one another. The method further involves disregarding any tool candidate detected at such a position that the position for the candidate deviates from the spatially even distribution. The advantages of this method, as well as the preferred embodiments thereof, are apparent from the discussion above with reference to the system.

According to a further aspect of the invention, the object is achieved by a computer program loadable into a non-volatile data carrier communicatively connected to a processing unit. The computer program includes software for executing the above method when the program is run on the processing unit.

According to another aspect of the invention, the object is achieved by a non-volatile data carrier containing the above computer program.

Further advantages, beneficial features and applications of the present invention will be apparent from the following description and the dependent claims.

BRIEF DESCRIPTION OF THE DRAWINGS

The invention is now to be explained more closely by means of preferred embodiments, which are disclosed as examples, and with reference to the attached drawings.

DETAILED DESCRIPTION

Figure 1:
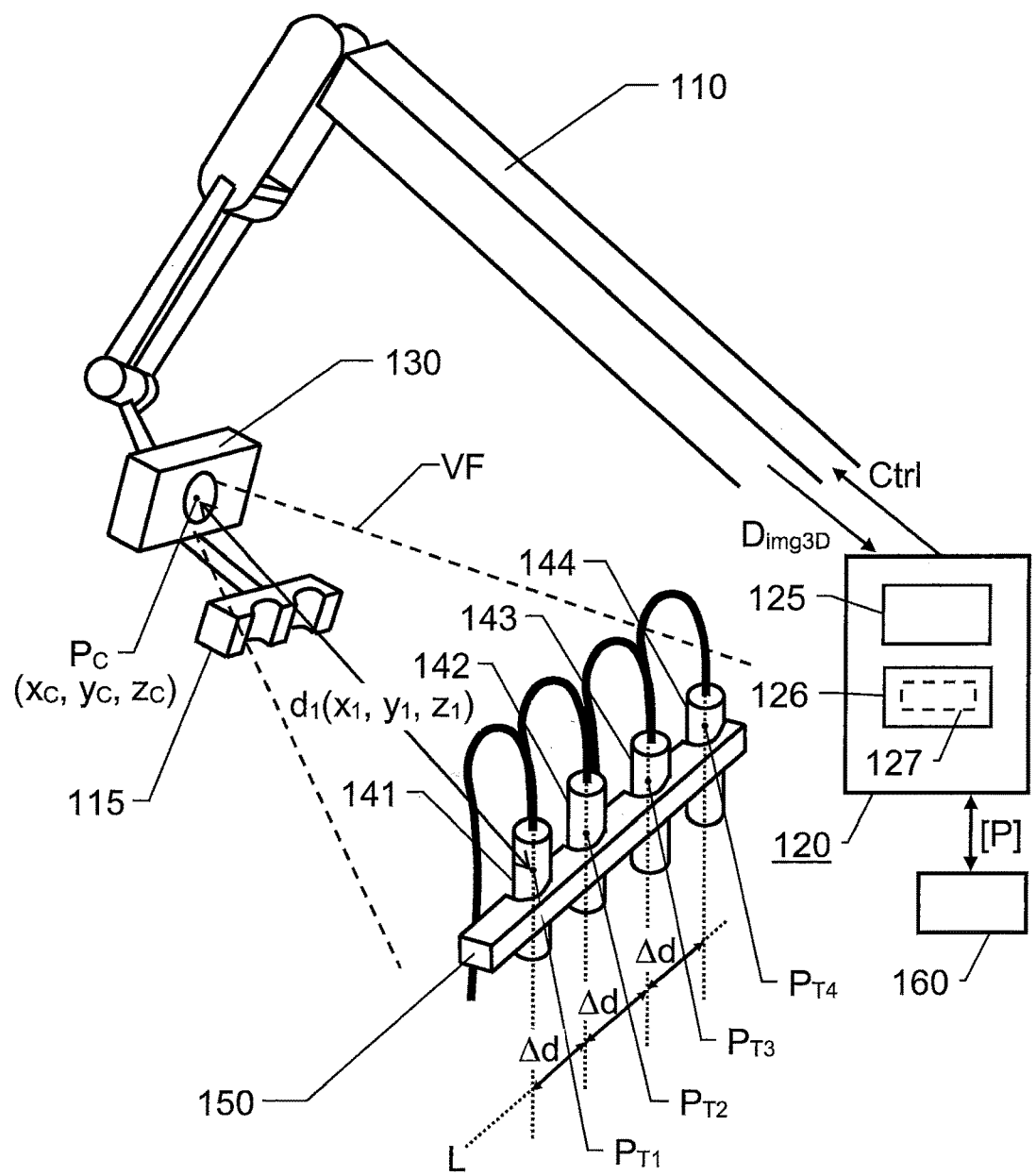
FIG. 1 shows a system for determining the positions of tools according to one embodiment the invention.

In FIG. 1, we see a system according to one embodiment of the invention. Here, the system is arranged to determine the respective positions of four different tools, for example a set of teatcups 141, 142, 143 and 144.

The system includes a camera 130 and a control unit 120. The camera 130 is configured to register three-dimensional image data $D_{img3D}$ of the tools 141, 142, 143 and 144 whose respective positions are to be determined. Preferably, the camera 130 is a time-of-flight camera (ToF camera), i.e. a range imaging camera system that resolves distance based on the known speed of light. According to the invention, however, the camera 130 may be any alternative imaging system capable of determining the respective distances to the objects being imaged, for example a 2D camera emitting structured light or a combined light detection and ranging, LIDAR, camera system. Moreover, the three-dimensional image data $D_{img3D}$ may be dynamic. This means that the three-dimensional image data $D_{img3D}$ can be represented by a video sequence and/or be built up from multiple still images registered from one or more origin locations $P_C$ in one or more angles.

Thus, the camera 130 is positioned at an origin location $P_C$, and may either be arranged on a robotic arm 110, as illustrated in FIG. 1, or be placed on another suitable structure, e.g. a tripod. In any case, the space coordinates $(x_C, y_C, z_C)$ of the origin location $P_C$ are known with high accuracy. As a result, the three-dimensional image data $D_{img3D}$ registered by the camera 130 forms a basis for determining the position of any object within a view field VF of the camera 130. Namely, the space coordinates for the particular point can be calculated based on the origin location $P_C(x_C, y_C, z_C)$ and data $d_1(x_1, y_1, z_1)$, e.g. a space vector, expressing a distance in three dimensions from the origin location $P_C(x_C, y_C, z_C)$ to the particular point on a depicted object. For example, the particular point can be a well-defined point on a first tool candidate $T_{C1}$, such as an intersection between a symmetry center of the teatcup body and the liner's edge to the teatcup body.

The control unit 120 is configured to cause the camera 130 to obtain three-dimensional image data $D_{img3D}$ representing the tools 141, 142, 143 and 144, and forward the three-dimensional image data $D_{img3D}$ to the control unit 120. The control unit 120 is then configured to identify tool candidates $T_{C1}$, $T_{C2}$, $T_{C3}$ and $T_{C4}$ in the three-dimensional image data $D_{img3D}$ using an algorithm involving matching the image data $D_{img3D}$ against reference data. For example, the reference data may comprise one or more characteristic patterns of the tool and/or a typical tool outline. The control unit 120 is configured to calculate a respective position $P_{T1}$, $P_{T2}$, $P_{T3}$ and $P_{T4}$ for each of the tools 141, 142, 143 and 144 based on the origin location $P_C(x_C, y_C, z_C)$ and data expressing respective distances from the origin location $P_C(x_C, y_C, z_C)$ to each of the identified tool candidates $T_{C1}$, $T_{C2}$, $T_{C3}$ and $T_{C4}$.

To improve the efficiency of the positioning process, the following strategy is applied according to the invention. Since it is safe to assume that each of the tools 141, 142, 143 and 144 is stored in a dedicated space, such as at a given position in a rack 150, it can be presumed that the tools 141, 142, 143 and 144 have predefined locations relative to one another. More precisely, the tools 141, 142, 143 and 144 are presumed to be arranged according to a spatially even distribution relative to one another. In FIG. 1, this inter-tool relationship is illustrated by means of an equal distance Δd separating each neighboring tool from one another in the rack 150.

The control unit 120 is configured to disregard any tool candidate $T_{C2}$, which is detected at such a position that the position for the candidate $T_{C2}$ deviates from the spatially even distribution. To determine whether or not a tool candidate deviates from the spatially even distribution, the control unit 120 may be configured to formulate the pattern recognition problem in the image data $D_{img3D}$ in terms of linear regression.

Using a fundamental concept that patterns from a single-object class lie on a linear subspace, a linear model can be developed, which represents the image data $D_{img3D}$ as a linear combination of class-specific galleries. The inverse problem may then be solved using the least-squares method. To this aim, the control unit 120 is preferably configured to apply a linear regression classification algorithm (LRC) on the three-dimensional image data $D_{img3D}$ to determine any deviation from the spatially even distribution of the 141, 142, 143 and 144.

The ability to distinguish the evenly distributed tools from other objects in the image data $D_{img3D}$ is beneficial, inter alia because the control unit 120 can thereby avoid regarding a pole, other stalling equipment or similar tool like object, in proximity to the tools as a tool candidate.

Figure 2:
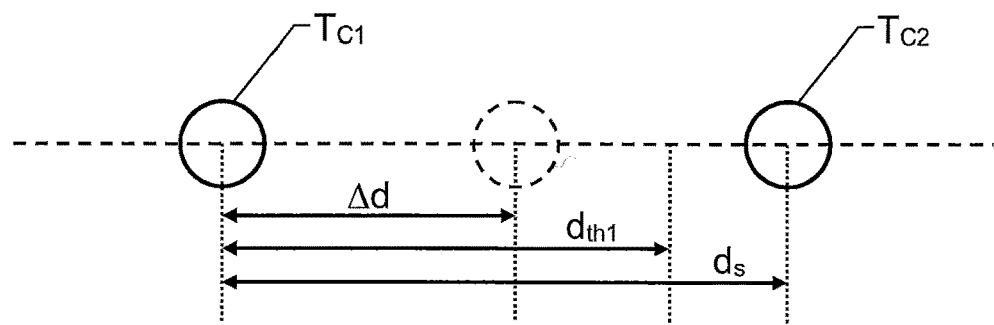
FIGS. 2-4 illustrate, schematically, how identified tool candidates can be discarded according to embodiments the invention.

Referring now to FIG. 2, according to the invention, the control unit 120 is configured to disregard any second tool candidate $T_{C2}$ that is detected at a separation distance $d_s$ from a first tool candidate $T_{C1}$, if the separation distance $d_s$ exceeds a first threshold distance $d_{th1}$ in relation to the predefined relative locations Δd. For example, if the equal distance Δd is 10 centimeters, any second tool candidate $T_{C2}$ detected more than 15 centimeters from a first tool candidate $T_{C1}$ may be discarded. Of course, this strategy is actually applicable to any number of tools larger than two.

Provided that there are three or more tools, say four tools 141, 142, 143 and 144, these tools may be arranged relative to one another in a predefined pattern, for instance in the corners of a square, along an arc or along a line L as shown in FIG. 1. In such a case, the control unit 120 is preferably configured to use information about the predefined pattern to confirm and/or disregard at least one of the tool candidates $T_{C1}$, $T_{C2}$, $T_{C3}$ and $T_{C4}$. Below, this will be exemplified by two embodiments of the invention.

Figure 3:
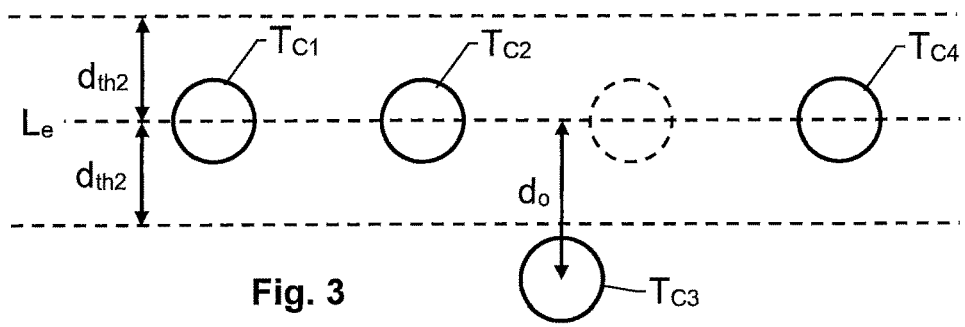

FIG. 3 illustrates a situation where a set of tools are stored in a rack 150 according to a linear arrangement. Here, the camera 130 has registered three-dimensional image data $D_{img3D}$ in which tool candidates $T_{C1}$, $T_{C2}$, $T_{C3}$ and $T_{C4}$ have been identified. As can be seen, a third tool candidate $T_{C3}$ has been detected at an outlier distance $d_o$ from an estimated line $L_e$ interconnecting at least two of the other tool candidates, here $T_{C1}$, $T_{C2}$, and $T_{C4}$ respectively, in a set of tool candidates for the tools. Provided that the outlier distance $d_o$ exceeds a second threshold distance $d_{th2}$, the control unit 120 is configured to disregard the detected tool candidate $T_{C3}$ according to one embodiment of the invention.

Figure 4:
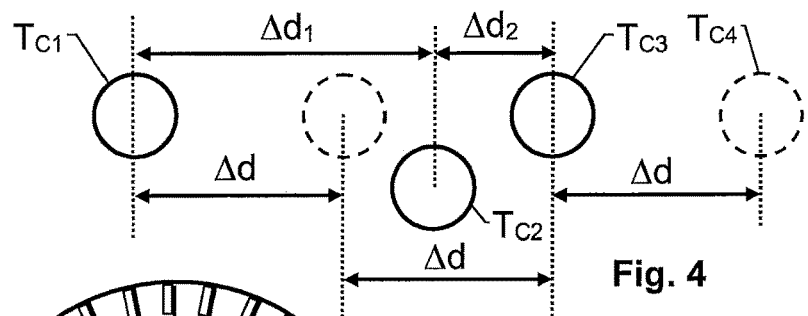

Moreover, if there is a plurality of tools 141, 142, 143 and 144, the control unit 120 may draw further conclusions based on the predefined pattern in which the tools are arranged relative to one another. FIG. 4 illustrates how an identified tool candidate $T_{C2}$ can be discarded according to a third embodiment the invention.

Here, four tools 141, 142, 143 and 144 are arranged in a line L (see FIG. 1) with an equal distance Δd between each neighboring tool in the line L. The control unit 120 is configured to use the information about the predefined tool pattern to disregard a tool candidate $T_{C2}$, which is detected at such a position that said tool candidate $T_{C2}$ results in that a difference between a first inter-distance $\Delta d_1$ and a second inter-distance $\Delta d_2$ exceeds a third threshold distance. The first inter-distance $\Delta d_1$ is an interspace between a primary pair of neighboring tool candidates, say $T_{C1}$ and $T_{C2}$, that includes said tool candidate $T_{C2}$ and a first other tool candidate $T_{C1}$. The second inter-distance is an interspace between a secondary pair of neighboring tool candidates; say $T_{C2}$ and $T_{C3}$, which includes said tool candidate $T_{C2}$ and another second tool candidate $T_{C3}$.

Analogously, the predefined pattern in which the tools organized may also be used by the control unit 120 to confirm a tool candidate. I.e. if, for example, a second tool candidate is found at the expected distance Δd from a first tool candidate, the position for the second tool candidate can be confirmed.

To facilitate making efficient use of the calculated tool positions [P] when operating the automatic milking arrangement, according to one embodiment of the invention, the system includes a memory unit 160, e.g. a storage medium in the form of a Flash memory or a Read Only Memory (ROM). The control unit 120 is further configured to store the respective positions [P] for the at least two tools 141, 142, 143 and 144 in the memory unit 160. The stored respective positions [P] are retrievable from the memory unit 160 by a tool-pickup system in connection with picking up at least one of the at least four tools 141, 142, 143 and 144, typically for attachment to an animal.

According to one embodiment of the invention, the at least four tools 141, 142, 143 and 144 are placed in a tool rack 150, as illustrated in FIG. 1. The system for determining the positions of tools in the automatic milking arrangement further contains a grip device 115, which is arranged on a robotic arm 110. After that the respective positions [P] have been stored in the memory unit 160, the control unit 120 is configured to retrieve the stored respective positions [P] from the memory unit 160, and control the robotic arm 110 and the grip device 115 to pick up at least one of the at least four tools 141, 142, 143 and 144 from the tool rack 150, so that for example this/these tool(s) can be attached to an animal. The grip device 115 may contain one or more electro-magnets configured to cooperate with one or more magnetic members on each of the at least four tools 141, 142, 143 and 144. Alternatively, or in addition thereto, the grip device 115 may contain at least one mechanical gripping claw configured to grasp around the tool itself or a part thereof, e.g. a grip bar.

Preferably, if a robotic arm 110 is included in the system, the camera 130 is arranged on the robotic arm 110. Namely, this highly facilitates implementing the above above-described procedure.

It is generally advantageous if the control unit 120 and the camera 130 are configured to effect the above-described procedure in an automatic manner by executing a computer program 127. Therefore, the control unit 120 may include a memory unit 126, i.e. non-volatile data carrier, storing the computer program 127, which, in turn, contains software for making processing circuitry in the form of at least one processor in the central control unit 120 execute the above-described actions when the computer program 127 is run on the at least one processor.

Figure 5:
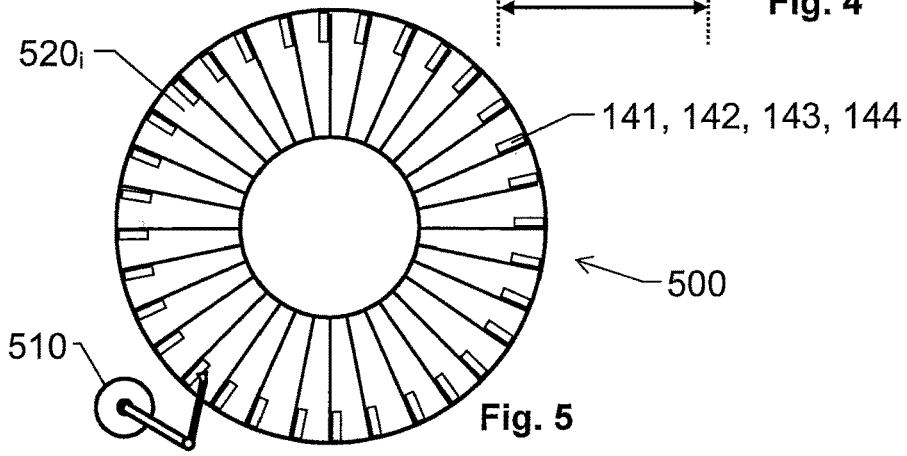
FIG. 5 shows a rotary milking platform according to one embodiment the invention.

FIG. 5 shows a rotary milking platform 500 according to one embodiment the invention. The rotary milking platform 500 has a plurality of milking stalls $520_i$, here 24 altogether. Each of the milking stalls $520_i$ contains at least four tools, symbolically indicated by the reference numerals 141, 142, 143, 144. The rotary milking platform 500 also includes a system for determining the respective tool positions, which is here symbolically indicated via the robotic arm 510. Said positioning system 510 is arranged to calculate a respective position $P_{T1}$, $P_{T2}$, $P_{T3}$ and $P_{T4}$ for the at least four tools 141, 142, 143 and 144 respectively in each of said milking stalls $520_i$ according to the procedure described above. Preferably, the rotary milking platform 500 is stepwise rotated pass the system 510 for calculating the respective tool positions for all the milking stalls $520_i$ on the platform 500 in a consecutive manner.

Figure 6:
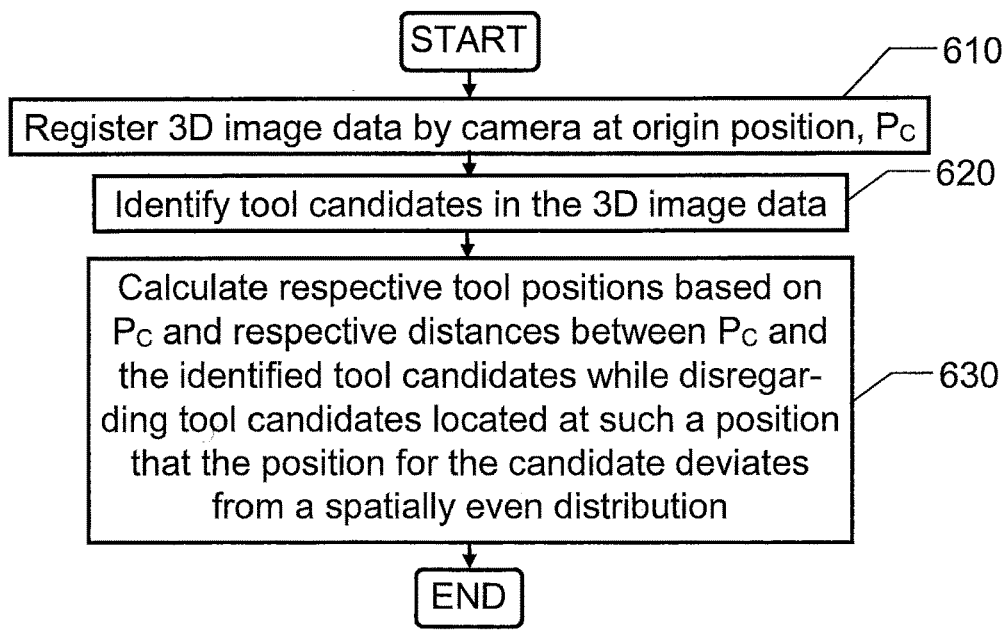
FIG. 6 illustrates, by means of a flow diagram, the general method according to the invention.

In order to sum up, and with reference to the flow diagram in FIG. 6, we will now describe the general method according to the invention for determining the positions of tools in an automatic milking arrangement.

In a first step 610, three-dimensional image data are registered via a camera at a known origin location. The three-dimensional image data represent at least four tools of the milking arrangement whose respective positions are to be determined.

In a subsequent step 620, tool candidates are identified in the three-dimensional image data using an algorithm that involves matching the image data against reference data.

Thereafter, in step 630, a respective position is calculated for the at least four tools. The position calculations are based on the known origin location of the camera and data expressing respective distances from the origin location to each of the identified tool candidates. The at least four tools have predefined locations relative to one another. More precisely, the at least four tools are arranged according to a spatially even distribution relative to one another. Any tool candidate disregarded, which is detected at such a position that the position for the candidate deviates from the spatially even distribution.

Subsequently, the procedure ends.

All of the process steps, as well as any sub-sequence of steps, described with reference to FIG. 6 may be controlled by means of a programmed processor. Moreover, although the embodiments of the invention described above with reference to the drawings comprise processor and processes performed in at least one processor, the invention thus also extends to computer programs, particularly computer programs on or in a carrier, adapted for putting the invention into practice. The program may be in the form of source code, object code, a code intermediate source and object code such as in partially compiled form, or in any other form suitable for use in the implementation of the process according to the invention. The program may either be a part of an operating system, or be a separate application. The carrier may be any entity or device capable of carrying the program. For example, the carrier may comprise a storage medium, such as a Flash memory, a ROM (Read Only Memory), for example a DVD (Digital Video/Versatile Disk), a CD (Compact Disc) or a semiconductor ROM, an EPROM (Erasable Programmable Read-Only Memory), an EEPROM (Electrically Erasable Programmable Read-Only Memory), or a magnetic recording medium, for example a floppy disc or hard disc. Further, the carrier may be a transmissible carrier such as an electrical or optical signal which may be conveyed via electrical or optical cable or by radio or by other means. When the program is embodied in a signal which may be conveyed directly by a cable or other device or means, the carrier may be constituted by such cable or device or means. Alternatively, the carrier may be an integrated circuit in which the program is embedded, the integrated circuit being adapted for performing, or for use in the performance of, the relevant processes.

The term "comprises/comprising" when used in this specification is taken to specify the presence of stated features, integers, steps or components. However, the term does not preclude the presence or addition of one or more additional features, integers, steps or components or groups thereof.

The invention is not restricted to the described embodiments in the figures, but may be varied freely within the scope of the claims.

The invention claimed is:

1. A system for determining the positions of tools in an automatic milking arrangement and picking up the tools, the system comprising:
   a camera (130) configured to, from an origin location (PC), register three-dimensional image data (Dimg3D) of at least four tools (141, 142, 143, 144) whose respective positions are to be determined;
   a control unit (120) configured to:
   cause the camera (130) to obtain three-dimensional image data (Dimg3D) representing the at least four tools,
   identify tool candidates (TC1, TC2, TC3, TC4) in the three-dimensional image data (Dimg3D) using an algorithm involving matching the three-dimensional image data (Dimg3D) against reference data, and
   calculate a respective position (PT1, PT2, PT3, PT4) for the at least four tools (141, 142, 143, 144) based on the origin location (PC(xC, yC, zC)) and data expressing respective distances (d1(x1, y1, z1)) from the origin location to each of the tool candidates (TC1, TC2, TC3, TC4) identified when the at least four tools (141, 142, 143, 144) are arranged according to a spatially even distribution relative to one another, and the control unit (120) is further configured to calculate the respective position (PT1, PT2, PT3, PT4) for each of the at least four tools (141, 142, 143, 144) based on the origin location (PC(xC, yC, zC)) and data expressing respective distances (d1(x1, y1, z1)) from the origin location to each of the tool candidates (TC1, TC2, TC3, TC4) identified while disregarding any individual tool candidate (TC2) at such a position that the position for the individual tool candidate (TC2) deviates from the spatially even distribution such that the position of the disregarded tool (TC2) is not calculated; and a tool-pickup system configured to use each of the calculated respective positions ($P_{T1}$, $P_{T2}$, $P_{T3}$, $P_{T4}$) in picking up the tools (141, 143, 144) located at the calculated respective positions (141, 143 and 144) while not picking up any disregarded tool (TC2).

2. The system according to claim 1, wherein the control unit (120) is configured to apply a linear regression classification algorithm on the three-dimensional image data (Dimg3D) to determine the spatially even distribution of the at least four tools (141, 142, 143, 144).

3. The system according claim 1, wherein the at least four tools (141, 142, 143, 144) are arranged relative to one another in a predefined pattern, and the control unit (120) is configured to use information about the predefined pattern to confirm and/or disregard at least one of the tool candidates (TC1, TC2, TC3, TC4).

4. The system according to claim 1, wherein the at least four tools (141, 142, 143, 144) are arranged along a line (L) and the control unit (120) is configured to disregard any tool candidate (TC3) detected at an outlier distance (do) exceeding a second threshold distance (dth2) from an estimated line (Le) interconnecting at least two other tool candidates (TC1, TC2, TC4) in a set of tool candidates for said tools.

5. The system according to claim 4, wherein the four tools (141, 142, 143, 144) are arranged with an equal distance ($\Delta d$) between each neighboring tool of said tools in said line (L), and the control unit (120) is configured to disregard a given tool candidate (TC2) detected at such a position that said given tool candidate (TC2) results in that a difference between a first inter-distance ($\Delta d1$) and a second inter-distance ($\Delta d2$) exceeds a third threshold distance, where the first inter-distance ($\Delta d1$) is an interspace between a primary pair of neighboring tool candidates (TC1, TC2) including said given tool candidate (TC2) and a first tool candidate (TC1) and the second inter-distance is an interspace between a secondary pair of neighboring tool candidates including said given tool candidate (TC2) and a second tool candidate (TC3).

6. The system according to claim 1, wherein, the respective position (PT1, PT2, PT3, PT4) for each of the at least four tools (141, 142, 143, 144) is expressed in terms of space coordinates for a particular point on an object depicted in the three-dimensional image data (Dimg3D).

7. The system according to claim 1, wherein, when a processing time after having obtained the three-dimensional image data (Dimg3D) in the control unit (120), less than a predefined number of tool candidates have been identified, the control unit (120) is configured to reposition the camera (130) to a new origin location (PC) from which the at least four tools (141, 142, 143, 144) are visible in the camera (130), cause the camera (130) to obtain updated three-dimensional image data (Dimg3D) representing the at least four tools, which updated three-dimensional image data (Dimg3D) have been registered from the new origin location (PC), calculate a respective position (PT1, PT2, PT3, PT4) for the at least four tools (141, 142, 143, 144) based on the new origin location (PC) and data expressing respective distances from the new origin location (PC) to each of the identified tool candidates (TC1, TC2, TC3, TC4).

8. The system according to claim 1, further comprising a memory unit (160), wherein the control unit (120) is configured to store the respective positions ($P_{T1}$, $P_{T2}$, $P_{T3}$, $P_{T4}$) for the at least two tools (141, 142, 143, 144) in the memory unit (160) from which the stored respective positions ($P_{T1}$, $P_{T2}$, $P_{T3}$, $P_{T4}$) are retrievable by the tool-pickup system in connection with picking up the at least one of the at least four tools (141, 142, 143, 144) for attachment to an animal.

9. The system according to claim 8, further comprising a tool rack (150), wherein the at least four tools (141, 142, 143, 144) are placed in the tool rack (150), wherein the system further comprises a grip device (115) arranged on a robotic arm (110), and after that the respective positions ($P_{T1}$, $P_{T2}$, $P_{T3}$, $P_{T4}$) have been stored in the memory unit (160), the control unit (120) is further configured to:

retrieve the stored respective positions ($P_{T1}$, $P_{T2}$, $P_{T3}$, $P_{T4}$) from the memory unit (160), and control the robotic arm (110) and the grip device (115) to pick up at least one of the at least four tools (141, 142, 143, 144) from the tool rack (150).

10. The system according to claim 9, wherein the camera (130) is arranged on the robotic arm (110).

11. A rotary milking platform (500) having a plurality of milking stalls (520$i$) each of which comprises at least four tools (141, 142, 143, 144), and the rotary milking platform (500) comprises a system for determining the positions of tools according to claim 1, which system is arranged to calculate a respective position (PT1, PT2, PT3, PT4) for the at least four tools (141, 142, 143, 144) in each of said milking stalls (520$i$).

12. A method for determining the positions of tools in an automatic milking arrangement and picking up the tools, the method comprising:

registering, via a camera (130) at an origin location (PC), three-dimensional image data (Dimg3D) representing at least four tools (141, 142, 143, 144) whose positions are to be determined;

identifying tool candidates (TC1, TC2, TC3, TC4) in the three-dimensional image data (Dimg3D) using an algorithm involving matching the three-dimensional image data (Dimg3D) against reference data;

calculating a respective position (PT1, PT2, PT3, PT4) for the at least four tools (141, 142, 143, 144) based on the origin location (PC(xC, yC, zC)) and data expressing respective distances (d1(x1, y1, z1)) from the origin location to each of the tool candidates (TC1, TC2, TC3, TC4) identified when the at least four tools (141, 142, 143, 144) being arranged according to a spatially even distribution relative to one another;

calculating the respective position (PT1, PT2, PT3, PT4) for each of the at least four tools (141, 142, 143, 144) based on the origin location (PC(xC, yC, zC)) and data expressing respective distances (d1(x1, y1, z1)) from the origin location to each of the tool candidates (TC1, TC2, TC3, TC4) identified while disregarding any individual tool candidate (TC2) detected at such a position that the position for the candidate (TC2)

deviates from the spatially even distribution such that the position of the disregarded tool (TC2) is not calculated; and having a tool-pickup system use each of the calculated respective positions (PT1, PT2, PT3, PT4) in picking up the tools (141, 143, 144) located at the calculated respective positions (141, 143 and 144) while not picking up any disregarded tool (TC2).

13. The method according to claim 12, comprising:
applying a linear regression classification algorithm on the three-dimensional image data (Dimg3D) to determine the spatially even distribution of the at least four tools (141, 142, 143, 144).

14. The method according to claim 13, wherein the at least four tools (141, 142, 143, 144) are arranged relative to one another in a predefined pattern, and the method comprises:
using information about the predefined pattern to confirm and/or disregard at least one of the tool candidates (TC1, TC2, TC3, TC4).

15. The method according to claim 12, wherein the at least four tools (141, 142, 143, 144) are arranged along a line (L) and the method comprises:
disregarding any tool candidate (TC3) detected at an outlier distance (do) exceeding a second threshold distance (dth2) from an estimated line (Le) interconnecting at least two other tool candidates (TC1, TC2, TC4) in a set of tool candidates for said tools.

16. The method according to claim 15, wherein the four tools (141, 142, 143, 144) are arranged with an equal distance (Δd) between each neighboring tool of said tools in said line (L), and the method comprises:
disregarding a given tool candidate (TC2) detected at such a position that said given tool candidate (TC2) results in that a difference between a first inter-distance (Δd1) and a second inter-distance (Δd2) exceeds a third threshold distance, where the first inter-distance (Δd1) is an interspace between a primary pair of neighboring tool candidates (TC1, TC2) including said given tool candidate (TC2) and a first tool candidate (TC1) and the second inter-distance is an interspace bet-ween a secondary pair of neighboring tool candidates including said given tool candidate (TC2) and a second tool candidate (TC3).

17. The method according to claim 12, wherein, the respective position (PT1, PT2, PT3, PT4) for each of the at least four tools (141, 142, 143, 144) is expressed in terms of space coordinates for a particular point on an object depicted in the three-dimensional image data (Dimg3D).

18. The method according to claim 12, wherein, when a processing time after having obtained the three-dimensional image data (Dimg3D), less than a predefined number of tool candidates have been identified, the method comprises:
repositioning the camera (130) to a new origin location (PC) from which the at least four tools (141, 142, 143, 144) are visible in the camera (130),
causing the camera (130) to obtain updated three-dimensional image data (Dimg3D) representing the at least four tools, which updated three-dimensional image data (Dimg3D) have been registered from the new origin location (PC), and
calculating a respective position (PT1, PT2, PT3, PT4) for the at least four tools (141, 142, 143, 144) based on the new origin location (PC) and data expressing respective distances from the new origin location (PC) to each of the identified tool candidates (TC1, TC2, TC3, TC4).

19. The method according to claim 12, comprising:
storing the respective positions (PT1, PT2, PT3, PT4) for the at least four tools (141, 142, 143, 144) in a memory unit (160) from which the stored respective positions (PT1, PT2, PT3, PT4) are retrievable by the tool-pickup system in connection with picking up at least one of the at least four tools (141, 142, 143, 144) for attachment to an animal.

20. The method according to claim 19, wherein the at least four tools (141, 142, 143, 144) are placed in a tool rack (150), the tool-pickup system comprises a grip device (115) arranged on a robotic arm (110), and after that the respective positions (PT1, PT2, PT3, PT4) have been stored in the memory unit (160), the method further comprises:
retrieving the stored respective positions (PT1, PT2, PT3, PT4) from the memory unit (160), and
controlling the robotic arm (110) and the grip device (115) to pick up at least one of the at least four tools (141, 142, 143, 144) from the tool rack (150).

21. A non-transitory data carrier (126) containing a computer program (127) loadable into a processing unit (125), the computer program (127) comprising software, when executed by the processing unit (125), causes the processing unit to perform the method according to claim 12.

\* \* \* \* \*